United States Patent
Maloney

(10) Patent No.: US 11,393,216 B2
(45) Date of Patent: Jul. 19, 2022

(54) METHOD OF COMPUTER VISION BASED LOCALISATION AND NAVIGATION AND SYSTEM FOR PERFORMING THE SAME

(71) Applicant: HORIBA MIRA LIMITED, Nuneaton (GB)

(72) Inventor: Andrew Maloney, Nuneaton (GB)

(73) Assignee: HORIBA MIRA LIMITED, Nuneaton (GB)

( * ) Notice: Subject to any disclaimer, the term of this patent is extended or adjusted under 35 U.S.C. 154(b) by 0 days.

(21) Appl. No.: 16/761,765

(22) PCT Filed: Nov. 7, 2018

(86) PCT No.: PCT/GB2018/053228
§ 371 (c)(1),
(2) Date: May 5, 2020

(87) PCT Pub. No.: WO2019/092418
PCT Pub. Date: May 16, 2019

(65) Prior Publication Data
US 2020/0349362 A1  Nov. 5, 2020

(30) Foreign Application Priority Data

Nov. 10, 2017 (GB) ..................... 1718628

(51) Int. Cl.
*G06V 20/56* (2022.01)
*G06T 7/70* (2017.01)
*G01C 21/30* (2006.01)
*G05D 1/02* (2020.01)
*G01S 19/47* (2010.01)

(52) U.S. Cl.
CPC ............. *G06V 20/56* (2022.01); *G01C 21/30* (2013.01); *G05D 1/0246* (2013.01); *G06T 7/70* (2017.01); *G01S 19/47* (2013.01); *G05D 2201/0212* (2013.01); *G05D 2201/0213* (2013.01); *G06T 2207/30252* (2013.01)

(58) Field of Classification Search
CPC ........ G06K 9/00791; G06K 9/00; G06T 7/30; G06T 7/33; G06T 7/337; G06T 7/70; G06T 7/73; G06T 7/74; G06T 2207/30244; G06T 2207/30252; G01C 21/30; G01C 21/32; G01C 21/3804; G01C 21/3807; G01C 21/3811; G05D 1/0246; G05D 2201/0212; G05D 2201/0213; G06V 20/56; G06V 20/58; G06V 20/582; G06V 20/584; G06V 20/586; G06V 20/588
See application file for complete search history.

(56) References Cited

U.S. PATENT DOCUMENTS

| | | | |
|---|---|---|---|
| 9,476,970 | B1 | 10/2016 | Fairfield et al. |
| 9,953,236 | B1 * | 4/2018 | Huang et al. ............ G06K 9/34 |
| 2008/0167814 | A1 | 7/2008 | Samarasekera et al. |
| 2016/0239973 | A1 | 8/2016 | Tanaka |
| 2016/0275350 | A1 * | 9/2016 | Raynaud et al. .. G06K 9/00671 |
| 2017/0200063 | A1 | 7/2017 | Nariyambut Murali et al. |

FOREIGN PATENT DOCUMENTS

| | | |
|---|---|---|
| EP | 0665507 A1 | 8/1995 |
| EP | 1677076 A2 | 7/2006 |
| EP | 3290864 A1 | 3/2018 |
| GB | 2548456 A | 9/2017 |
| WO | WO2016/146641 A1 | 9/2016 |
| WO | WO2017/120595 A2 | 7/2017 |
| WO | WO 2018/031678 A1 | 2/2018 |
| WO | WO 2018/104563 A2 | 6/2019 |

OTHER PUBLICATIONS

Great Britain Intellectual Property Office, "Search Report" in application No. GB1718628.9, dated Apr. 25, 2018, 6 pages.
European Patent Office, "Search Report" in application No. PCT/GB2018/053228, dated Mar. 25, 2019, 18 pages.
European Patent Office "Examination Report" in Application No. 18811893.9, dated Dec. 17, 2021, 6 pages.
Current Claims in Application 18811893.9, dated Dec. 2021, 5 pages.

* cited by examiner

*Primary Examiner* — Andrew W Johns
(74) *Attorney, Agent, or Firm* — Hickman Becker Bingham Ledesma LLP

(57) ABSTRACT

In relation to the field of vehicle navigation, we describe a method of determining a position of a subject (such as a vehicle, platform or target), comprising the steps of obtaining and storing an object dataset comprising object data indicative of one or more objects in an environment, including an indication of object parameters associated with the or each object, the object parameters including one or more of location, orientation, one or more dimensions, and a type associated with the object, obtaining environment data indicative of a region of the environment from a sensor associated with the subject, determining the presence of an observed object in the environment data, including determining one or more equivalent observed object parameters associated with the observed object, and determining the position of the subject based on a comparison of the observed object parameters with the equivalent object parameters of the objects in the object dataset.

20 Claims, 10 Drawing Sheets

METHOD OF COMPUTER VISION BASED LOCALISATION AND NAVIGATION AND SYSTEM FOR PERFORMING THE SAME

CROSS-REFERENCE TO RELATED APPLICATIONS

The present application is a U.S. national stage application filed under 35 U.S.C. § 371 based upon international patent application number PCT/GB2018/053228 filed Nov. 7, 2018, which claims priority to Great Britain patent application number 1718628.9 filed on Nov. 10, 2017, the entire contents of each of which are hereby incorporated by reference as if fully set forth herein for all purposes.

FIELD OF THE DISCLOSURE

The present invention relates to a method of computer vision based localisation and navigation, and a system for performing the same.

BACKGROUND

Navigation systems for vehicles typically involve receipt of a signal from multiple satellites in order to determine the approximate position of a vehicle on a map. In situations in which a vehicle is unmanned, and is either operated remotely or is controlled by a 'self-driving' control unit using artificial intelligence to react to observed conditions, it is essential for the operator or control system of the vehicle to know the position of the location of the vehicle. The same also applies to manned vehicles, in which it is common to use a Global Positioning System ('GPS') for example, to facilitate route planning, and this is particularly the case where the driver of the vehicle is unfamiliar with the surrounding environment.

It is also known for localisation and navigation systems to be provided in consumer electronics products such as smart phones, smart wearable devices, tablet computers, laptop computers and the like, to allow a user to establish their location in unfamiliar surroundings, and to plan or navigate journeys.

However, there are circumstances in which satellite signals may be unavailable or in which it is undesirable to establish a connection with a satellite signal. For example, for navigation underground (i.e. through tunnels, mines, or other underground structures), on lower floors of multi-storey structures, or where satellite coverage is otherwise inadequate (if the sky is obscured or if there is interference with the signal, or a satellite failure, for example), it may not be possible to maintain a reliable connection between the navigation or localisation system and the satellites. There may also be circumstances where satellite navigation is intentionally or unintentionally denied, and therefore other means of navigation may be more appropriate.

It is also known to be possible to use alternative terrestrial signals either designed for the purpose or signals of opportunity to provide location information, such as WiFi signals, and broadcast television or radio signals.

Computer vision technology has been adapted to use conventional pattern recognition functions to determine key features in images and compare those key features with those of other pre-located images in a database so as to identify a location. This has been used to identify tourist landmarks, for example, from photographs. However, to apply such an image-based feature mapping technique to real-time data for the purpose of navigation would require access to an unrealistically large dataset of image information against which to match the observed image data, and this fails to provide a practical solution. Additionally, the conventional image processing approach identifies groups of features which are not sufficiently distinctive to enable positions to be determined over a wide area.

SUMMARY

The present invention seeks to reduce or ameliorate one or more problems associated with prior systems.

A method is described which uses Computer Vision (CV) and Deep Convolutional Neural Networks (CNN) with Region Proposals to identify objects that may be used as landmarks around a vehicle (or any other platform on which the system is provided, or any target which is observed by the system). A sensor (such as a camera, for example) observes an area around the host vehicle. References made herein to a vehicle apply equally to the any target or platform in relation to which the system is used. The term 'subject' shall be used to cover all of these possibilities, so that references to a subject apply to a vehicle, to a platform or other target in relation to which the system is used.

A system implementing an Artificial Neural Network (ANN) identifies any objects that may be used as landmarks in the observed data (i.e. images captured by the camera). The Neural Network also generates segmentation—a bounding box region proposal or pixelwise classification for the identified objects. The objects and landmarks are classified by type semantically. For example, objects may be identified as a building, tree, road, road edge, signpost, lamp post, telegraph pole or other street furniture, or other landscape features such as hilltops, rivers, bridges, hedges, fences or the like, and are tagged with measurement data about their dimensions and position (i.e. size, height, width, edges, bearing and range) relative to a datum on the subject (i.e. vehicle, target or platform) or sensor. The absolute position and dimensions relative to the datum on the platform can be determined by using a pin hole camera model and trigonometry assuming a flat earth or by using stereo vision, LIDAR ranging or other techniques. A Monte Carlo Localisation (MCL) algorithm is then used to evaluate the probability of those landmarks being observed in those relative positions from multiple different locations within the environment, based on the system's prior or current knowledge of the landmarks in that environment or map. For example, knowledge of the positions and dimensions of trees, buildings and roads within an environment provides the system with the facility to assess data recorded from the camera or other sensor used by the subject, to assess the relative position of the vehicle relative to those known landmarks. The system output includes the situation, location and orientation of the vehicle. If the environment data is a map then the system is able to determine the absolute position and orientation of the vehicle, platform or target in the coordinate system of the map.

The system uses region proposal techniques, and deep convolutional neural networks which have recently been shown to equal the human ability to recognise images (i.e. to identify objects in images). In broad terms, the system recognises landmarks from images (and other data) captured by the system, and uses a probabilistic approach to determine the likely position of the subject within the environment and its orientation. In doing so, the system provides localisation information which may be used for navigation within the environment, without requiring GNSS (Global Navigation Satellite Systems) thus allowing improvements in vehicle, robot or platform autonomy. To speed up initial acquisition of a position solution the system can be initialised by a user or by a complementary system such as GNSS. The system can also be used to augment or check that a complimentary GNSS system is outputting the correct information.

According to a first aspect of the invention we provide a method of determining a position of a subject, comprising the steps of obtaining and storing an object dataset comprising object data indicative of one or more objects in an environment, including an indication of object parameters associated with the or each object, the object parameters including one or more of location, orientation, one or more dimensions, and a type classification associated with the object, obtaining environment data indicative of a region of the environment from a sensor associated with the subject, determining the presence of an observed object in the environment data, including determining one or more equivalent observed object parameters associated with the observed object, and determining the position of the subject based on a comparison of the observed object parameters with the equivalent object parameters of the objects in the object dataset.

According to a second aspect of the invention we provide a system for determining a position of a subject, comprising:

a storage device configured to store an object dataset comprising object data indicative of one or more objects in an environment, including an indication of object parameters associated with the or each object, the object parameters including one or more of location, orientation, one or more dimensions, and a type classification associated with the object, a sensor configured to obtain environment data indicative of a region of the environment, an object detection module configured to determine the presence of an observed object in the environment data, including determining one or more equivalent observed object parameters associated with the observed object, and a position detection module configured to determine the position of the subject based on a comparison of the observed object parameters with the equivalent object parameters of the objects in the object dataset.

According to a third aspect of the invention, we provide a vehicle configured to perform the method according to the first aspect of the invention and/or including the system of the second aspect of the invention.

Further features of the aspects of the invention are set out in the appended claims.

BRIEF DESCRIPTION OF THE DRAWINGS

We now describe features of embodiments of the invention, by way of example only, with reference to the accompanying drawings of which

DETAILED DESCRIPTION

Figure 1:
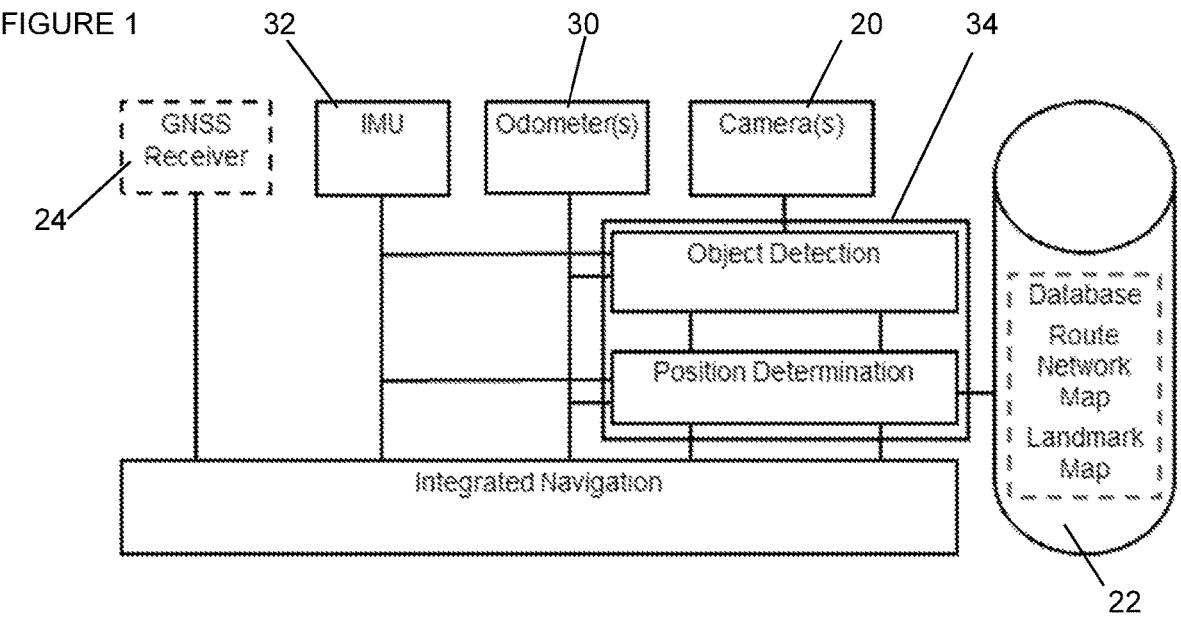
FIGS. 1 and 2 are diagrammatic views of embodiments of the system of the present invention.

The invention generally relates to a system for determining a position of a subject (also referred to herein as a position detection system). For the sake of simplicity, the subject is described herein as a vehicle, although it should be understood that the subject may take a different form. For example, the subject may comprise a mobile cellular telephone or another piece of electronics equipment, or the like, or may be any target object or platform with which the system is to be used. It is generally considered that the position detection system will be located at or on or inside the subject, and that, in effect, the system is used to establish its own position. In other cases, elements of the system may be located at or on or inside the subject, while other elements of the system are provided locally but removed from the subject, or where other elements are provided remote from the subject.

Where a vehicle is discussed, we refer to both ground vehicles and other types of vehicle including aircraft and waterborne or underwater craft, for example. Ground vehicles include but are not intended to be limited to cars, motorbikes, lorries, vans, agricultural vehicles, industrial vehicles and robots, whether road vehicles or those intended for off-road use. The vehicle may be manned or un-manned.

In broad terms, the system 10 of the invention obtains and stores an object dataset comprising object data indicative of one or more objects in an environment. This established object dataset contains information about landmarks known or assessed to be in the environment, including one or more properties such as type, location (or position relative to a predetermined point in the environment), orientation and size/dimensions. This object property information is stored as a set of parameters, in a text or semantic form.

Where the term 'object' is used, we mean any landmark or feature of an environment, including manmade and natural features. Objects may also include permanent or temporary features. The objects may be manmade or natural landmarks. The types of landmarks may include one or more of vegetation, hill-tops, streams, bridges, buildings, structures, other geographic features, signs, telegraph poles, pylons, street lights and roads, road edges or road markings, or any other street furniture, for example.

The system then uses a position detection module to determine a likely position of the subject/vehicle in the environment, based on sensor data (such as a camera image, for example), taken from the vehicle. In other words, the system 10 obtains environment data indicative of a region of the environment (i.e. surrounding the vehicle) from a sensor associated with the vehicle. From this data, the system 10 determines the presence of an observed object in the environment data using an object detection module, as described below. This step includes determining one or more equivalent observed object parameters associated with the observed object (i.e. that the object is of the same type as one or more of those in the dataset, or has the same dimensions, for example to ascertain a match between objects).

Whereas the system 10 is described as including a camera (which is typically mounted at, on or within the subject/vehicle), it should be understood that other types of sensor 20 may be used. The sensor may comprise a camera, a LIDAR system (including a sensor), a RADAR system (including a sensor), a SONAR system (including a sensor), a radiation detector, or a magnetic field sensor, or any combination of sensors as described, for example.

The system 10 determines the position of the vehicle based on a comparison of the observed object parameters with the equivalent object parameters of the objects in the object dataset, using the position detection module as described below. The observed object may be considered to match if one or more of its parameters is the same as, or within a predetermined threshold of, the corresponding parameter stored in the object data set.

In embodiments, the system 10 outputs at least a direct instruction to control the vehicle 42 based on the determined position of the vehicle 42. This instruction may be provided to a user (such as a driver) with a specified or suggested action, or direction. The instruction may be provided to part of an automated system navigating or driving the vehicle. The instructions include a trajectory or path to follow to guide the vehicle to the next location or waypoint on its route or to keep the vehicle on a road or track.

In embodiments, the object detection module includes an Artificial Neural Network (ANN). In particular, the ANN may be a Convolutional Neural Network, which is trained and optimised to recognise objects, features and landmarks and/or features associated with objects, features and landmarks.

The system 10 further comprises a position detection module for comparing the position of the landmarks observed from the vehicle 42 to the positions of known landmarks as recorded in the object dataset.

The system 10 is configured to output a location (or relative position in the environment) correlating the most position of the best candidates at any point in time. The system 10 may additionally output a likelihood or confidence parameter associated with the estimated best candidate, and/or may output one or more next best candidates.

The system 10 may additionally include a navigation module, for providing route data to guide the vehicle to a subject location. The subject location may be determined by an autonomous navigation module, for autonomously controlling the movement of the vehicle in the absence of a human driver, for example. It should be understood that a drive-assist system or autopilot may take partial control of the vehicle where a driver is also present, and the present invention may also be applied to such partially-autonomous systems.

The object detection module, position detection module and, where employed, the navigation module are components of a processing system 12, which in turn includes a memory device 14, a processor 16 and a storage device 18. The processing system 12 is in communication with the object dataset which is provided on a storage device 22 which may be formed integrally with processing system 12. Sensors 20 including a camera provide input to the processing device 12, A GNSS (Global Navigation Satellite System) receiver 24 may optionally form part of the system 10, for receiving a remote signal from a satellite source 26. However, as explained, the system 10 of the present invention does not rely on receipt of satellite signals.

As shown in FIG. 1, an embodiment of the processing system 34 may lie between the one or more camera(s) 20 (and potentially other sensors) and an integrate navigation system, so that the processing system 34 interprets the data received by the camera(s) 20, and processing the images to determine a position of the vehicle in its environment, with reference to the object dataset held on a storage device 22. The processing system 34 may provide road edge detection functionality (as is known in the art), landmark detection using the object detection module, and subsequently localisation using the position detection module (implementing Monte Carlo Localisation techniques) as described.

Figure 2:
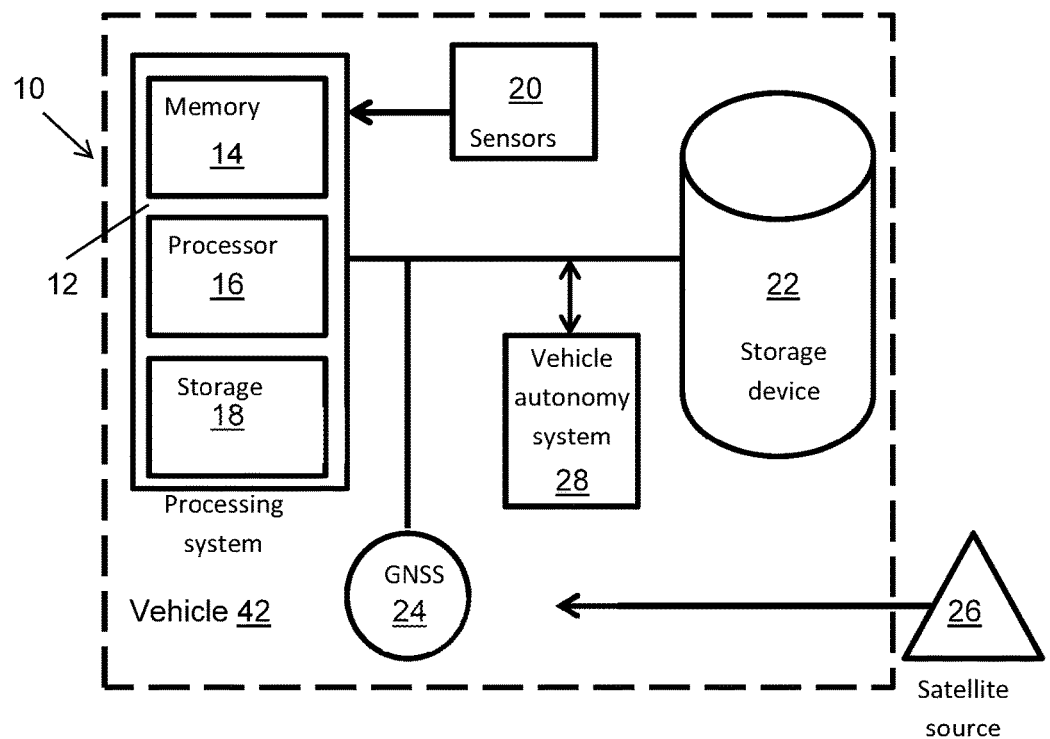

As illustrated in FIG. 2, the system 10 may communicate with a system for providing vehicle autonomy 28, to navigate and/or otherwise control operation of the vehicle 42.

Figure 8:
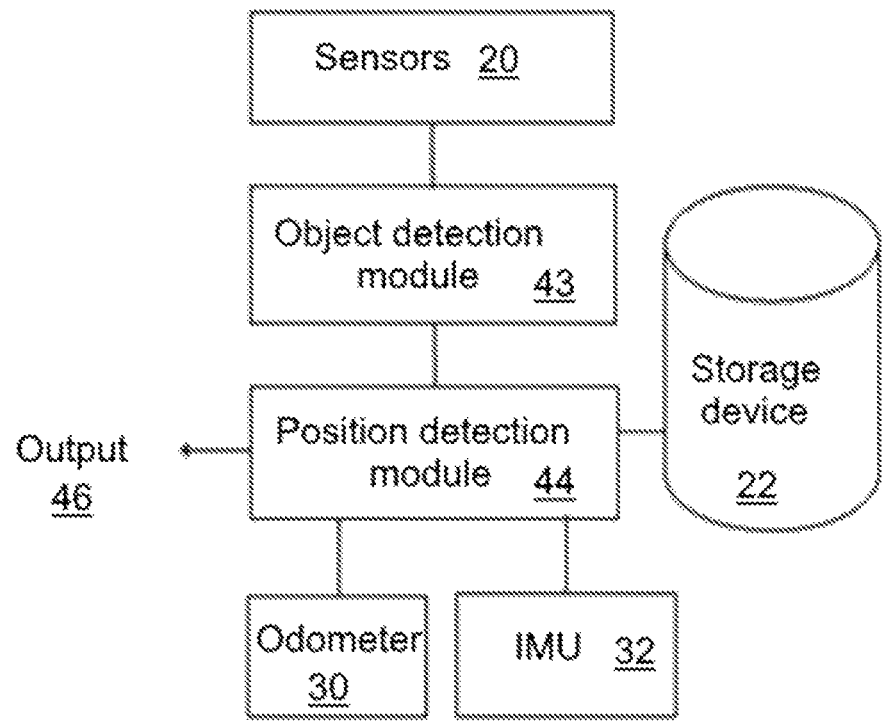
FIG. 8 is a diagrammatic representation of embodiments of the system of the present invention.

FIG. 8 provides diagrammatic layouts of systems according to embodiments of the invention. FIG. 8 shows that data is provided from one or more sensors 20 (e.g. a camera) to the object detection module 43. The object detection module 42 of embodiments of the invention uses an ANN to detect objects within the sensed data (and associated positions and/or further parameters of the objects). This information is passed to the position detection module 44, which makes reference to the stored object dataset held in storage device 22. With knowledge of sensed readings from the inertial measurement unit 32 and odometer(s) 30, the position detection module 44 compares the identified objects against those about which data is stored in the dataset, and using the known positions of those matched objects in the object dataset, and knowledge of the bearing and distance moved by the vehicle since the sensed data was collected by the sensors 20, provides an output 46 including the position of the subject. The output may further include the bearing/heading of the subject.

The Object Dataset and Dataset Acquisition

In embodiments, the object dataset is provided to the system from a remote source. The object dataset may be stored remotely from the system and vehicle and may be accessed remotely as required. However, importantly, the object dataset may also be stored locally (i.e. on board) for access by the system when there is no remote connection to a network or remote data source available. This allows the vehicle operating the system to operate autonomously without requiring communication with any external or remote source.

In other embodiments, the system may include a dataset generator which is configured to determine the properties of landmarks identified from images or other data provided to the dataset generator. For example, aerial images of the environment may be provided, and the dataset generator may be configured to apply classification techniques to identify properties of landmarks shown in the images. Roads, trees and structures may be identified from data provided to the dataset generator, which in turn outputs an object dataset suitable for use by the position detection module.

The object dataset is, in embodiments, a database of landmarks and their geographic locations. This can be provided as a text or binary file identifying the landmark type, easting, northing and height, for example.

| Easting, | Northing, | Height, | Type |
| --- | --- | --- | --- |
| 436234, | 294999, | 2.27399, | tree |
| 436237, | 294999, | 2.16033, | tree |
| 438773, | 294999, | 8.499, | tree |
| 437069, | 296866, | 3, | building |

In broad terms, the object dataset contains data encoded as strings in text or binary format (or in any other base format), identifying parameters of the objects in the dataset. The parameters may be stored in a delimited form, for example, or in any suitable data structure. It should be appreciated that parameters identifying the objects are stored, rather than image or video data, for example. The dataset therefore comprises non-image files. This ensures a relatively small storage size (compared to raw or processed image data, for example).

In this way, the object dataset provides a set of semantic data, each item of which does not describe any property of the image (or other sensor data) that was analysed to produce it. So, for example, the properties East, North, Height and Type do not define any aspect of the image from which the object was identified. The parameters East and North may be determined by identifying that an image contains a tree object, for example, but that image might be taken from any direction and any position, and the East and North values are subsequently calculated based on more than simply the image data. Knowledge of the position of the camera capturing the image, and the direction in which the image was taken, are also needed in order to assess the geographic position of the tree. Of course, an image of that tree may be captured from any angle or position, and therefore the semantic data providing parameters of the North and East position are completely independent of any specific image data.

In the same way, the height of the tree cannot be assessed from a single image without knowledge of the scale of the image, or the distance of the camera from the tree, or the angle at which the image was taken. So, in the same way, the height provides a semantic datum which is not associated with any specific image or other sensor data.

The type of the object is also disassociated from any specific image or sensor data properties. While it is true that the object type can be determined from an image, on a probabilistic basis (as carried out by the object detection module, for example), the semantic label 'tree' does not clearly define any single specific property of the image. So, the object type labels stored in the object dataset provide an abstract way to identify that any image of the object is likely to fall within a particular subset of the set of all images of objects of that type. In other words, knowledge that an object is a tree does not allow a user to recreate an image of that particular tree, other than within a very broad concept of what a tree might look like. This means that the type data stored in the dataset does not relate to any specific image or sensor data, and merely provides a label for use in later comparisons, once observed objects have been identified with a 'type' by the object detection module.

Since identifying the type of an object (i.e. landmark) is a complex problem, use of an object dataset that is a semantic dataset as discussed above is suitable for use with an artificial neural network that is configured to identify such objects.

It will also be apparent that the system 10 determines the position of the subject as an absolute position within an environment, rather than simply as a position relative to an object captured in a portion of that environment detailed in an image, for example. Therefore, use of an object dataset that provides absolute coordinates for objects within the environment is required.

An object dataset including absolute position data for objects or landmarks in a global reference frame allows absolute positioning or an object dataset with relative position data for the objects allows relative positioning for example relative to a subjects starting point or other datum.

In contrast to other approaches this means it is possible to carry a database with large geographic coverage on board a subject vehicle due to its compact size and therefore low storage requirements. It is not feasible (and may be impossible) to store detailed imagery for a large geographical area locally (e.g. on board a subject vehicle) and impossible to search such data in real time, with sufficient accuracy, to identify a location. However it is possible to store the object dataset for a large area in a semantic form, in which relevant features of the objects have been identified, in order to achieve fast position acquisition and real time positioning and navigation using computer vision. Of course, other file types are also suitable as is known in the art. In embodiments, the file is encrypted, so that knowledge of a key is required to access the data.

In embodiments, the object dataset includes information compiled from pre-established databases of roads, buildings, or other cartographic data. In embodiments, the information may be extracted from images using automatic feature extraction and identification techniques. Aerial imagery may be used as a source, and convolutional neural networks may be used to determine the data to be included in the dataset.

In embodiments, the object dataset is established prior to use of the system, and may be shared by and/or distributed to multiple systems for their use. In embodiments, the object data set is generated (or additional data is generated and aggregated with an established object data set) at the outset of use of the system. In embodiments, the object data set it updated and/or supplemented during use of the system, as new sensor data is recorded and analysed.

In embodiments, the object data set may be generated based on sensor data (such as image data) acquired by an acquisition system including one or more sensors (which may include cameras, for example). The acquisition system may capture data including object data while travelling through the environment, from which the object data set may be generated. In this way the object data set may be created and/or augmented during live operation of the system. The acquisition system may comprise a ground vehicle, or may comprise an aircraft, for example. Data may be provided to the position detection system from the acquisition system during use. As an example, an aircraft (such as an unmanned aircraft, for example) may fly over the environment capturing aerial images of the environment. The acquisition system may include processing capability to generate an updated object data set (or to generate data for addition to an existing object data set), and may communicate the object data or object data set to the position detection system, to update its working object data set.

In embodiments, aerial images of the environment are used to generate the object data set. In embodiments, LIDAR, RADAR and/or other map data may be used to generate the object data set.

Figure 9:
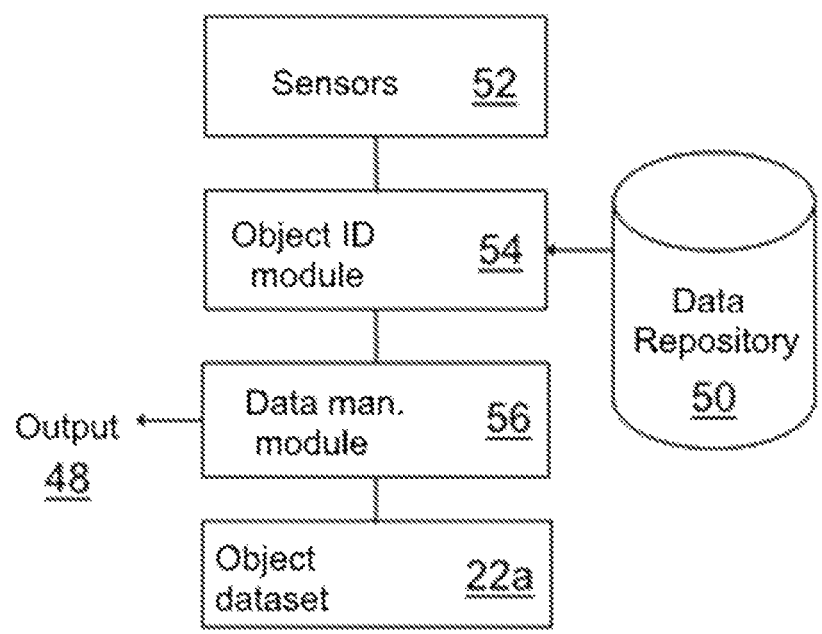
FIG. 9 is a diagrammatic representation of an acquisition system according to embodiments.

FIG. 9 illustrates an acquisition system of embodiments. The acquisition system includes one or more sensors 52 (cameras or other sensors such as a LIDAR, for example). The sensors 52 may provide real time (or close to real time) aerial data about the environment, for example. The data from the sensors is passed to an object identification module 54, from which data about object parameters associated with identified objects is extracted (using a deep convolutional artificial neural network, for example). In this way, landmarks may be identified from the aerial data, and the positions of the landmarks in a reference frame (and other parameters such as orientation and dimensions, for example) may be recorded.

Historic data such as map data and old aerial images from a data repository 50 may be included with the incoming sensor data, to be processed by the object identification module 54.

Data including identified objects and their associated parameters is then passed to a data management module 56, to be processed and stored in an appropriate format. Object data from an existing object dataset 22a or the current object dataset may be combined with the newly processed data.

The output 48 from the acquisition system is either provided as additional data to be added to an existing object dataset, or provided as updates to an object dataset, or may comprise a new complete object dataset.

As previously described, in embodiments of the system, the acquisition system is active during operation of the position detection system as the vehicle (or other subject) moves through an environment. The acquisition system in such cases is operable to create or to augment the object dataset. In this way, a subject revisiting a location (or a position near to) a location it has previously visited—and therefore in an area within which data about the objects in the local environment has been observed and stored—is able to navigate through that environment using the data from the object dataset.

Identification of Objects

The system identifies objects observed in the environment using the object detection module.

The object detection module may operate on an embedded series or parallel processor, for example, or on any suitable computational system as is known in the art.

Figure 5:
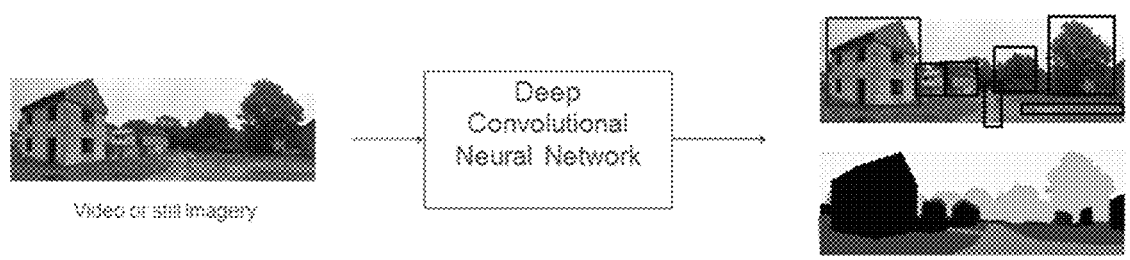
FIG. 5 is a diagrammatic illustration of using an ANN to identify objects in an image including regional proposals.

FIG. 5 shows a simplified illustration of how a CNN is used to identify objects in a captured image, for example. From the image, objects are identified against the object parameters stored in the dataset (using the semantic details stored about each object), and labelled. The objects are classified by pixel and/or region, with depth and position data relative to the images space (i.e. where in the environment captured in the image are the objects located?). Based on this knowledge, and the relative range to the sensor, the position to the subject can be calculated as explained in more detail below.

For example, in relation to FIG. 5, the following data may be obtained:

Class (x,y,r) e.g. Building
Subclass (x,y,r)
Subclass (x,y,r)
Class (x,y,r) e.g. Tree
Subclass (x,y,r)

In other words, the ANN may determine information that a building type object is observed at recorded relative position x, y, and range r. Knowing the position from which the observation is made (i.e. from where the images is captured), the relative and/or absolute position of the object may be recorded in the dataset. Furthermore, when the system is operating to calculated the position of the subject, extracting the information that a building type object is observed at a recorded relative position x, y and at range r, allows the position detection module to estimate the position of the subject relative to the positions of known buildings about which data is stored in the object dataset.

In embodiments, Artificial Neural Networks (ANN) are used to identify objects. ANN are inspired by and attempt to emulate the neurons found in the human brain. An ANN comprises nodes approximating behaviour of individual neurons, each being relatively simple and having a number of weighted inputs, a bias factor and an activation function to trigger an output. They can be configured and trained to represent a wide variety of logics and to approximate any continuous function. A typical network consists of input neurons, at least one layer of 'hidden' neurons, and a layer of output neurons.

Convolutional Neural Networks (CNN) emulate biological vision systems and feature convolution layers and pooling layers. Convolutional layers use learnable filters and convolve these across an input volume. This enables the network to learn filters that activate when it detects some specific type of feature at some spatial position in the input. Pooling layers enable down sampling of areas of the input volume by finding the maximum output for a given area. This prioritises the spatial relationship of detected features over their exact location. Together convolution and pooling enable object recognition networks to be created that can be run in real time on processors that can be realised.

Figure 10:
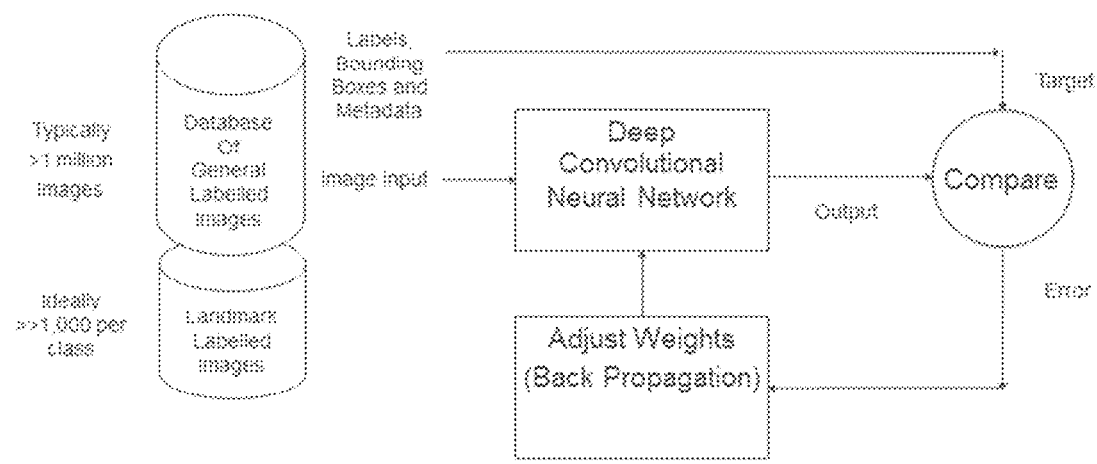
FIG. 10 is a diagrammatic overview of a process of training an ANN using back propagation.

FIG. 10 provides an overview of a process of training an ANN using back propagation to adjust its weights in order to match observations of objects in a training databased of labelled images. In this way, the ANN is trained to label future observations of objects recognisable from the training sample.

In general terms, in embodiments of the system, the object recognition module runs an ANN providing input neurons equivalent to the pixel values from a frame of video or an image captured by the camera (or an array of data of another type recorded by a sensor). The pixel values can include Red (R), Green (G), Blue (B) colour data and also optionally range or depth (D) information. The network layers of neurons and associated weights are effectively trained during optimisation of the ANN prior to use. The output neurons effectively represent the classes of landmark(s) detected and the position and extent of landmarks in the image frame. In embodiments, the ANN is a "deep" neural network—in which more than one hidden layer of neurons is included. In embodiments, typically between 10 and 14 hidden layers are used. This may result in around 14 million weights and biases attributed to the edges linking the layers of nodes. In embodiments, the ANN provides convolution, pooling (i.e. down-sampling) and Region Proposals. Convolutional Neural Networks (CNN) take advantage of the fact that the input is an image. An input image may be configured as an array of values corresponding to each of the red, green and blue values of each pixel in the image, each value having an associated input node of the ANN. The convolutional structure of the early layer(s) (at least) of the network acts upon small areas of the input and the weights of those nodes (i.e. neurons) effectively represent image filters across each sub-region of the image. Such filters may represent a diagonal edge across a portion of the image, for example. The outputs of the convolutional layer—as discussed below—are activated where a feature is detected in that respective region of the image. In embodiments, the ANN contains multiple convolutional layers, appropriate to the number and complexity of features to be detected.

Figure 11:
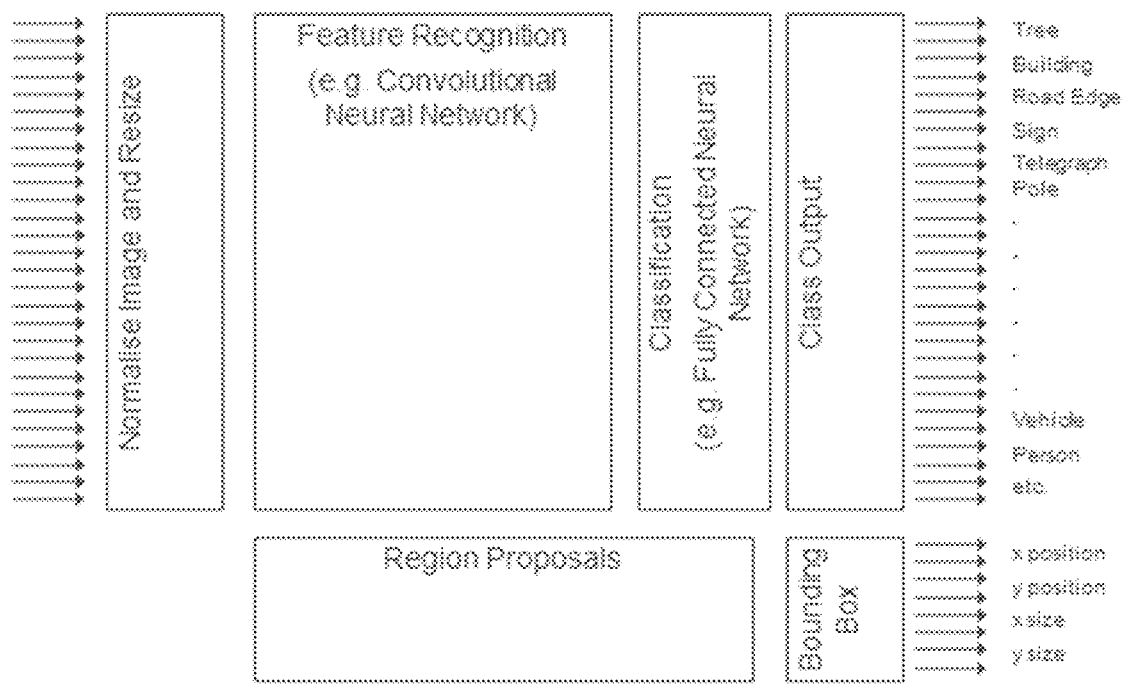
FIGS. 11, 12 and 13 are diagrammatic representations of an example of how an ANN according to embodiments may be used to perform object type classification and provide region proposals, using feature recognition and region determination in an image space, and an example of a region classified image.
Figure 12:
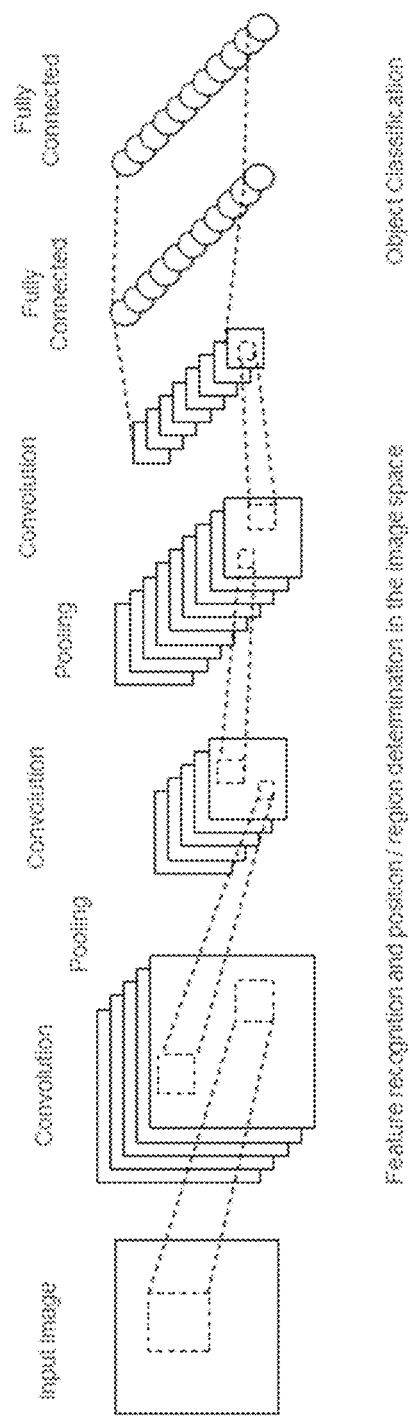
Figure 13:
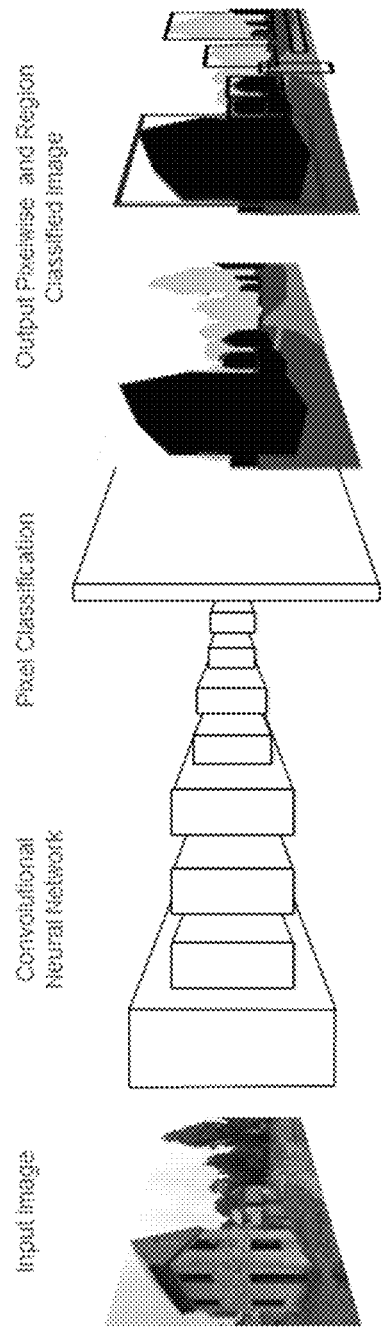

FIGS. 11, 12 and 13 are diagrammatic representations of an example of how an ANN according to embodiments may be used to perform object type classification and provide region proposals, using feature recognition and region determination in an image space, and an example of a region classified image. FIG. 11 illustrates an image input received by the ANN, which may include RGB (red, green and blue) values, and optionally range or depth information. The array of pixels of each colour may be fed to the input nodes of the ANN in order, for example. The layers of the ANN normalise and/or resize the image, perform feature recognition, classify the objects recognised, and then output classification types representing the type of object seen in the image (i.e. tree, building, road edge, etc.). The ANN may also output region proposal information including a bounding box defined by the x and y positions of the object, and the x and y sizes of the object (i.e. where is the object, and how large is the object). In this way, the ANN outputs object detections with classification and position information, and a measure of the object's extent in the image space.

In an example, the filtering process may work by providing a matrix of weights to apply to the filter region, to highlight the pattern or effect that is to be matched against the region being considered. A value output from each region to which the filter is applied then effectively provides an output matrix of the determined values, so that the presence or otherwise of the feature being filtered can be determined at all regions across the image, thus providing an activation map.

Typically the filter matrix provides high weight values for pixels within the region that are to be recognised in the inspected region of the image, and typically provides zeros elsewhere. In this way, a high aggregate output value represents the presence of the feature in the region being examined, and a low value means that the feature was not present in that region. The regions that match the feature represented by the filter are activated by a high output value, to be fed into the next layer of the ANN.

The network effectively slides the filter across the input image representation at its layer and performs convolution. This tends to cause activation as there is correlation between the filter' and the image.

Pooling down-samples the image, taking for example 9 adjacent pixels and combining them into a single element in the next layer. This dramatically reduces complexity and required computations.

A mechanism is employed to detect where an object captured in an image is positioned relative to the image frame (and therefore subsequently its position relative to the camera and/or vehicle). One way of locating the landmark in the image is to generate multiple boxes of different sizes and run the network on those to see if a landmark fits for example but this would be very processor intensive. One of the methods used by an embodiment of the invention is selected so as to take advantage of the way the Convolution and Pooling features sample the image space and generates the bounding box functionality without much impact on computational load. In embodiments, the use of "region proposals" in the ANN enable the module not only to determine what landmarks are detected in the image, but also in which portion of the image they appear. The landmarks may then be bounded by a box, representing their relative location in the image. Alternative methods are possible for locating specific areas containing objects or landmarks in the image including pixel wise classification or single shot detection techniques for example. The information determined by the ANN about the position of the object may include coordinates in the image frame, elevation, azimuth and range or depth relative to the host platform.

Final range and bearing to any detected objects or landmarks are computed after the ANN stage using knowledge of the position of the cameras on the subject, any camera calibration data and inertial information such pitch, roll and yaw or heading.

The final layer of the ANN provides an estimate of the feature being classified belonging to each of the categories of object or landmark being assessed. In other words, the output represents a probability distribution over the object or landmark "type" categories. For example, the object detection module may provide an output that proposes that an object is likely to be tree with relative probability 0.95, or to be a building or road sign with probability 0.03 and 0.02 respectively. In alternative embodiments, the ANN can simply output the category assigned the highest likelihood of being correct. A threshold can also be set so that object detections below a certain relative likelihood are ignored.

It should be noted that the processing time required by the ANN may result in a delay between an image being captured (or other sensor data being collected) and the result of a detection being output by the network. This delay means that the position of the observed object relative to the subject or vehicle and/or sensor may have changed by the time the object is classified if the vehicle is in motion. Object detections are passed to the position determination (particle filter) part of the system which also takes time to compute the likely position of the vehicle at the point the image was captured. To counter this, data collected from the odometer 30 and/or the IMU 32 may be used to account for the movement of the subject or vehicle in the time that has passed since the image acquisition and to take this into account when the position detection module determines the position of the vehicle. Integration with the odometry and IMU information not only allows the effects of latency due to processing time to be corrected for but also for the output position and heading data rate to be increased. The resulting higher output rates allow the system to be used for autonomous control of a vehicle for example.

For the purpose of systems incorporating the present invention, useful landmarks include trees, buildings, rivers, bridges, edges of roads, tracks (including track edges, for example), signs, telegraph poles and other types of street furniture. In embodiments of the invention, the object recognition module is configured to classify (i.e. recognise) one or more types of landmark.

An example ANN was trained on a computer fitted with one or more General Purpose GPU (GPGPU) cards each with 12 GB RAM and processors with 3072 cores each. Training the ANN is much more processor intensive and time consuming than running a trained network. For real time operation, the ANN was deployed on an embedded processor with 256 processor cores and the particle filter was deployed on an embedded processor with 4 cores.

The Position Detection Module

The position detection module uses a probabilistic model to determine where the subject is likely to be, in the environment, based on the current observations of landmarks from the object detection module, and the data in the object dataset. In embodiments, the position detection module uses a particle filter algorithm (implementing Monte Carlo Localisation (MCL) techniques) to compute a most likely position given the landmarks observed, based on the information in the object dataset. The position detection module may also take into consideration a known current direction of travel, heading, and distance travelled, and previous probable locations (based on previous iterations of the algorithm, for example.

It should be understood that other techniques may also be used, in addition to or instead of a particle filter (such as a Kalman Filter or an Extended Kalman Filter, for example).

In embodiments, the system is initialised by a user inputting data relating to an initial position in the environment, for the system to use as a known starting point. In addition, or alternatively, a GNSS position may be determined where GNSS capability is included in the system, to provide a starting position. In addition, or alternatively the last known position or position probability distribution computed by the system may be used. A measure of uncertainty in the initialisation position may be included.

In embodiments, if no known starting location is provided, the system will calculate potential positions using the position detection module, based on any current observations. The system may use data from one or more object data sets, in combination with multiple position detection modules (or at least multiple instances of the position detection algorithms) to identify probable locations of the subject vehicle within large geographic areas. These may be carried out in parallel (and by multiple processing devices), for example. The results may be combined, and the process continued only in relation to one or more geographic areas (and associated object datasets) with which a relatively high likelihood of the subject being in that associated area is determined. Areas deemed unlikely to include the subject position may be discarded from consideration.

The system may, even when a high likelihood navigation or localisation solution is determined, continue to search the wider area for alternative possible solutions in the background.

In embodiments, the position detection module uses a Monte Carlo Localisation technique (described interchangeably herein as a particle filter algorithm, which is how it is implemented in embodiments) which estimates probabilities that the vehicle is at each of a plurality of nodes (also referred to as 'particles') representing different possible locations within the environment. The nodes assessed to have the highest likelihoods associated with them are determined to be the best candidates, and the most likely to be correct (i.e. to accurately reflect the position of the vehicle in the environment). Those nodes having the lowest likelihoods associated with them are considered the weakest candidates, and are trimmed from future iterations, to be replaced by nodes associated with newly selected positions in the environment, chosen to be positioned close to the best candidates, for future iterations of calculations. In this way, over multiple iterations, the nodes for which the likelihoods are calculated begin to cluster around the most likely positions, and eventually converge around a single most likely location. The system may carry out any number of iterations, using the position detection module, and as the subject (i.e. vehicle) moves through the environment, the newly captured data and subsequent new detections of landmarks within sight of the subject/sensor (i.e. camera), provide an updated stream of data from which to generate updated likelihoods at the set of nodes currently under consideration.

Starting with a uniform random distribution of particles across a search space (extent determined by the uncertainty in the initial position) the vehicle moves and senses the environment. Each particle represents a possible location for the subject. As the vehicle moves and captures new image data, and detects the presence of landmarks in those images, the filter computes how well the relative landmark measurements correspond to each of the possible locations for the vehicle, based on the predetermined knowledge of the position of landmarks in the environment.

The particles are weighted accordingly and then the particles are resampled with highly unlikely particles being eliminated and more particles being generated around the locations of particles with higher associated likelihoods.

The subject then moves and the motion is measured by sensors on the vehicle. An odometer 30 is used in embodiments, as discussed below. The heading/bearing of the vehicle is also measured by sensors which in embodiments include an inertial measurement unit (IMU) 32. The positions of the nodes/particles are propagated and moved in the appropriate direction and the corresponding distance. The sensors then take new measurements and the cycle repeats with the particles approaching a representation of the position and orientation of the subject and its likely error. The positions of newly propagated particles may be determined (at least in part) by the bearing and movement measurements made by the sensors 30, 32.

In embodiments, if the subject has no wheels (or is otherwise not using its wheels for motion, and therefore an odometer cannot be used), then a video feed or series of images from the camera 20 (or from a separate camera or cameras, which may include a camera of a smart device carried on board the vehicle, for example) may be used to estimate the distance travelled.

Figure 3:
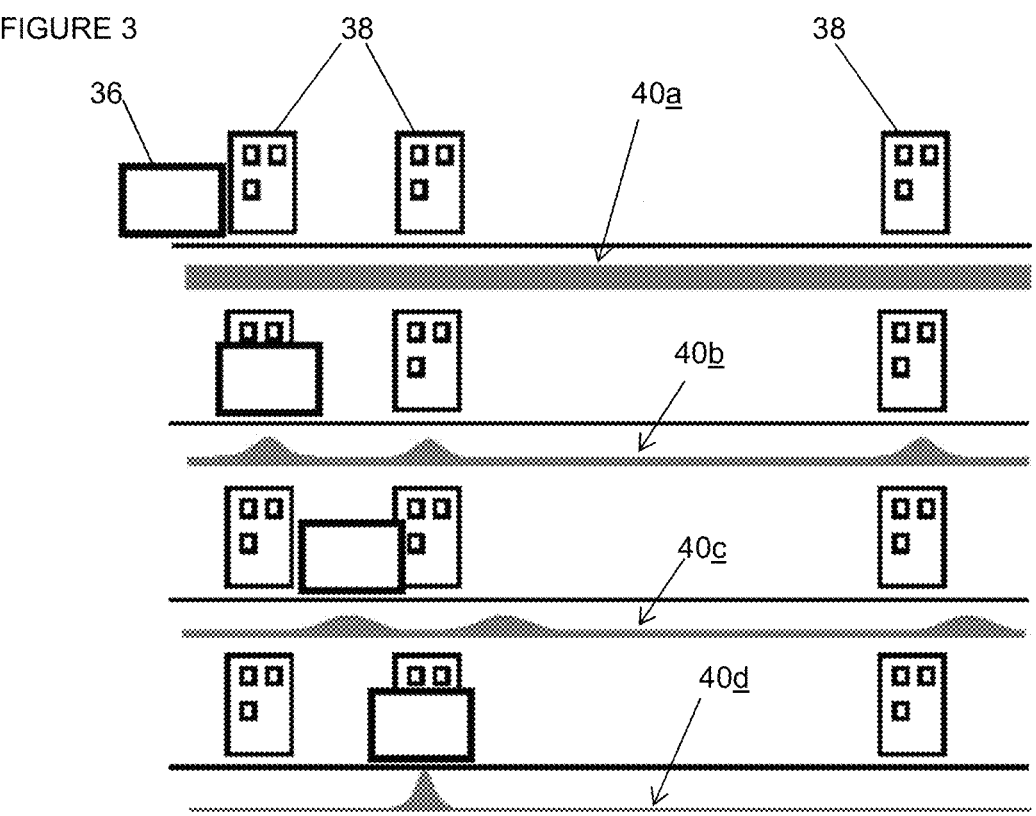
FIG. 3 is a diagrammatic view providing an example of the use of Monte Carlo (or Filter Particle) algorithms for localisation.

FIG. 3 shows the localisation concept in one dimension. In the first diagram the vehicle 36 senses no landmarks 38 and the probability distribution 40a of the position represented by the grey bar is distributed uniformly across the map. In the next diagram the vehicle moves and detects the building which is a landmark. Intuitively it can be seen that the location could equally be in any of three places. The spread in the probability distribution 40b results from noise in the odometers 30 and the measurement of the landmark position. In the following step the vehicle moves again and detects nothing the particles and hence the distribution 40c moves with the vehicle and spreads out due the cumulative effect of the noise in the odometers 30. In the final diagram the vehicle detects another landmark and can only be in one location, as reflected by the revised probability distribution 40d.

While the distribution is shown as being continuous across the sample space, it should be understood that the distribution is typically discrete, split across the multiple nodes/particles used by the algorithm. The particles are a discrete sample that is representative of the continuous distribution shown. The more particles used the better the representation but the higher the processing demands. In embodiments typically the order of 1,000 particles are used as a minimum. In embodiments, the number used may be between 100 and 15,000, or between 500 and 10,000, and preferably is around 700-5,000, and more preferably at least 1000, for example. The locations of the particles may be randomised across the environment in the first instance, or may be randomised regionally, ensuring that a minimum number appears in each portion of the environment, to ensure a fair coverage of the environment or map.

Figure 4A:
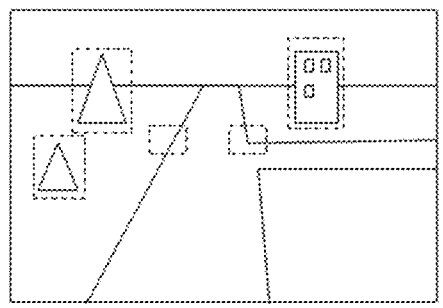
FIGS. 4A and 4B are diagrammatic illustrations of how the position of the subject is detected according to embodiments of the invention.
Figure 4B:
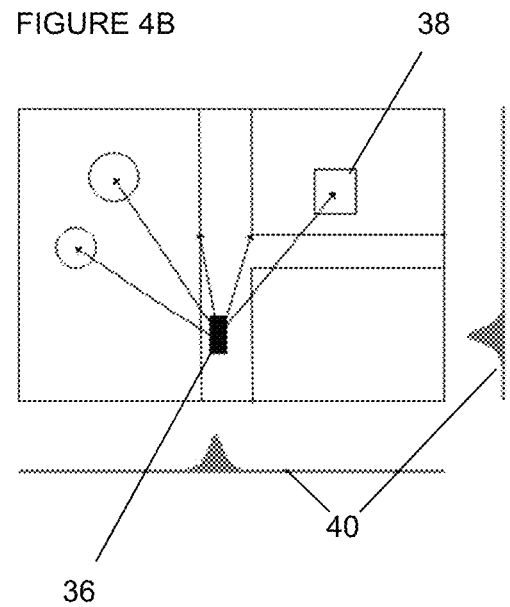

FIGS. 4A and 4B illustrate the localisation concept in combination with the detection of objects in the local environment. FIG. 4A shows an example view from the location of a subject, including regional proposals within the field of view from the camera, identifying objects local to the subject. FIG. 4B illustrates the resulting probability distributions over X and Y coordinates likely to match the position of the subject, taking into account the object parameters of the observed objects (including their respective locations).

Over sufficient iterations, the algorithm converges on the true position and orientation of the subject or vehicle so long as the subject or vehicle is positioned within the environment covered by the particle distribution and for which there are objects or landmarks in the object dataset.(Current autonomous systems are reliant on GNSS which suffers from interference and is easily jammed. This system operates under GNSS denied conditions and enables a step change in autonomy, localisation and perception. The invention provides localisation and navigation in areas where satellite navigation (GNSS/GPS) is unavailable or denied. The system also allows increased autonomy for unmanned vehicles by providing an understanding of their surrounding environment and location at the semantic level. For example, rather than streaming back live video to a remote controller, which consumes a lot of radio bandwidth, an autonomous system may send back a concise semantic report about what it is observing. A further benefit of recognising landmarks at the semantic level is that more advanced artificial intelligence processing can be added later to enable understanding of the scene and the situation. For example, rather than recognising a location simply by matching pre-recorded images to as a relative position to those previously recorded, determining features in the environment and their relative positioning may enable an advanced AI system to determine further information about the context of the situation.

The approach requires only a map database and does not require any expensive infrastructure or satellite constellation.

The system may integrate multiple cameras, and the cameras may provide panoramic capability. The cameras may include a stereo camera giving greater range perception and accuracy. The cameras may include an infra-red sensitive camera (in which case the system may also include one or more IR illuminators). To operate in total darkness, one or more thermal cameras may be used. To view a landmark through smoke, a millimetre wave camera may be used.

Since the object dataset contains semantic data about the landmarks being viewed, the system does not require that images captured by the cameras resemble images of the landmarks, since the object recognition module need only recognise that the object belongs to a certain category—not that it is a particular instance of that type of object. This feature makes the system very suitable for use in differing light and visibility conditions.

Operation of the system at night time may require or benefit from access to a separate trained ANN to distinguish alternate feature sets observed under limited lighting conditions.

It will be apparent that in an environment with no landmarks, the system will not be able to determine its location since there are no landmarks to provide relative data. However, it is very unusual for an environment to be entirely devoid of landmarks. It is also the case that the system may operate in a dead reckoning mode, using knowledge of a prior position, and data recorded from its odometer 30 and bearing information, to determine to a good accuracy where the subject has travelled from its last known position. When one or more landmarks are subsequently encountered, the system will know to a relatively high accuracy where the subject is located.

On-board sensing is provided by odometry 30 (wheel speed sensors), an inertial measurement unit (IMU) 32 and video camera. The sensor data (from the odometer(s) 30 and IMU 32 may also be used by the system 10 to correct the angle of the camera, to correct pitch and roll of the subject, for example.

The system may obtain absolute or relative height information from a barometric pressure sensor.

In embodiments, the system may use gyroscopes, magnetometers and/or accelerometers to provide an Inertial Measurement Unit (IMU) 32 or Integrated Navigation System (INS) with data to determine the relative or absolute bearing, heading or orientation of the subject and/or the distance travelled by the subject. This may be used to updated the particle filter algorithm, for example, as described.

In embodiments, the sensor data output from the odometer(s) 30 and IMU 32 are also provided to the processing system 34. In this way, the processing system may keep track of the subject's movement, and so track its progress through the environment. This progress tracking may be matched against the localisation information determined by the position detection module to cross-check the determined position in the environment. This may highlight erroneous operation of the sensors 30, 32, or of the position detection module. In embodiments, one or more of the components may be reset as a result of a discrepancy in their output.

It should be appreciated that the position detection module may identify more than one potential location of the vehicle at any point in time. If, for example, the terrain is covered by very similar landmarks or the vehicle enters a new environment with limited information about its current position, the position detection module may identify one or more likely locations, and may assign to each a confidence in that assessment. In this way, the system may determine that there is uncertainty in the position of the vehicle, and may modify the behaviour of the control system of the vehicle—or the data it is relaying to its user—as a result.

In general terms, the system performs the following method to obtain an estimate of the position of the subject.
  Obtain image data via the sensor(s) (e.g. the camera(s)), and—where available—obtain range data (i.e. depth of field information from the camera),
  Obtain odometer and IMU data,
  Run ANN to detect any objects (i.e. landmarks) within the image data,
  Use position detection module to propagate particles forward using motion model and odometry and IMU data,
  Compare predicted/expected landmark probability distribution(s) with actual observation(s) using particle filter,
  Propagate solution forward to the current time (i.e. to reflect the present position of the subject and the state of its surrounding environment) using a motion model and odometry and IMU data,
  Update localisation, position, heading and velocity state of the subject as recorded by the system,
  Repeat these steps.

Further detail of these steps is set out in the following further description.

The following additional information provides a more general description of techniques and methods outlined above, as well as more specific examples of how various techniques may be implemented. It should be understood that references in the following passages to vehicles and to various types of landmark should be read in the context of the foregoing description as relating to a general 'subject' that may not necessarily be a vehicle, and to landmarks of all types and other objects as described above.

Artificial Neural Network

Artificial Neural Networks emulate the neurons found in the human brain and are relatively simple having a number of weighted inputs, a bias factor and an activation function to trigger an output. They can be configured to represent any logic. A typical network consists of input neurons, in our case these are pixel values from a frame of video, at least one "hidden" layer of neurons and a layer of output neurons, the output neurons represent for example the classes of landmark or object detected. A deep neural network is one which has more than one hidden layer. The neurons are connected outputs to inputs between layers. In embodiments we have experimented with networks having between 10 and 14 hidden layers and around 14 million weights and biases.

With reference to FIGS. 12 and 13, networks used for object or landmark detection and positioning also feature Convolution, Pooling and Region Proposals. Convolutional Neural Networks (CNN) take advantage of the fact that the input is an image (pixels as inputs split into their Red, Green and Blue (RGB) values). A typical input layer would have the dimensions of the image and a depth of 3 for the RGB channels, each convolutional layer then transforms a 3d input volume into a 3d output volume. The structure of the network acts upon small areas of the input and the weights of those neurons effectively represent image filters, a diagonal edge for example. The network effectively slides the filter across the input image representation at its layer and performs convolution. This tends to cause activation as there is correlation between the 'filter' and the image.

Pooling down samples the image as we progress through the layers of the network, taking for example 9 adjacent pixels and combining into one pixel in the next layer. This usually takes the highest pixel value of the 9 to be the value in the next layer and is known as max pooling. This reduces the complexity of the network without significantly affecting its performance.

The final layers of the neural network are Fully Connected (FC) this means that they are connected to all the activations in the previous layer and would be computed as a matrix multiplication of weights followed by a bias offset. The FC layers perform the final object classification and the final layer computes the class scores.

The Neural Networks used in embodiments to detect and classify objects and landmarks are developed using four phases:

Configuration—a neural network design is created and called up as a configuration of software libraries, for example number of convolutional layers, number of fully connected layers, output classes etc.

Training—hyper parameters are specified and a training set of images is called up. The network is trained by presenting the images in batches computing the error, back propagating to update the weights and repeating until satisfactory detection rates are achieved.

Validation—a separate set of image data is put through the system to check that the detection and classification performance is satisfactory.

Deployment—the trained network configuration, libraries and weights and biases determined in training are deployed on to the target platform.

The approach with the current systems under development is to train the neural network off line and then disable learning, validate the network and then deploy it as a fixed entity.

Using Stochastic Gradient Descent (SGD) neural networks are trained using this process:
1. Initialise the network weights
2. Pass training images through a forward pass of the network layers
3. Calculate the loss at the output of the network compared to the label
4. Calculate the loss gradients by back propagation through the network
5. Update the network weights using the calculated gradients to reduce the overall loss of the network
6. Iterate 2-5 until there is no error or the loss no longer reduces Monte Carlo/Particle Filter Positioning and Localisation In order to make use of the landmark detections for estimating the position of the land vehicle the problem is formulated as one of data fusion between a dead reckoning system, referred to as the control input, and measurements from a feature classification and detection system, referred to as the measurement input.

An effective method of performing data fusion is to use the Bayes Filter algorithm. This algorithm gets its name from its use of Bayesian statistical inference, where prior probability in the state of the system is used to condition the assessment of new information. The algorithm relies on knowledge of the statistical properties of the error processes present in the control and measurement data, known as the Bayesian prior probability which in this case are: random errors in the dead reckoning sensors (sensor bias and noise), and random errors in the measurement (mis-calculated range and relative bearing, a priori position errors, and mis-classifications, etc.).

There are several forms of the Bayes filter algorithm each with their own strengths and weaknesses. The particle filter form of the Bayes Filter algorithm is used in embodiments due to the relatively simple construction of the measurement model, the ability to use the full non-linear process equations and its ability to cope with multi modal distributions in the state belief. Each of these properties make it more effective than the Kalman filter. However, the cost is a more computationally expensive algorithm that does not scale well with large state vectors. For this reason in embodiments the state vector is intentionally kept small.

Figure 6:
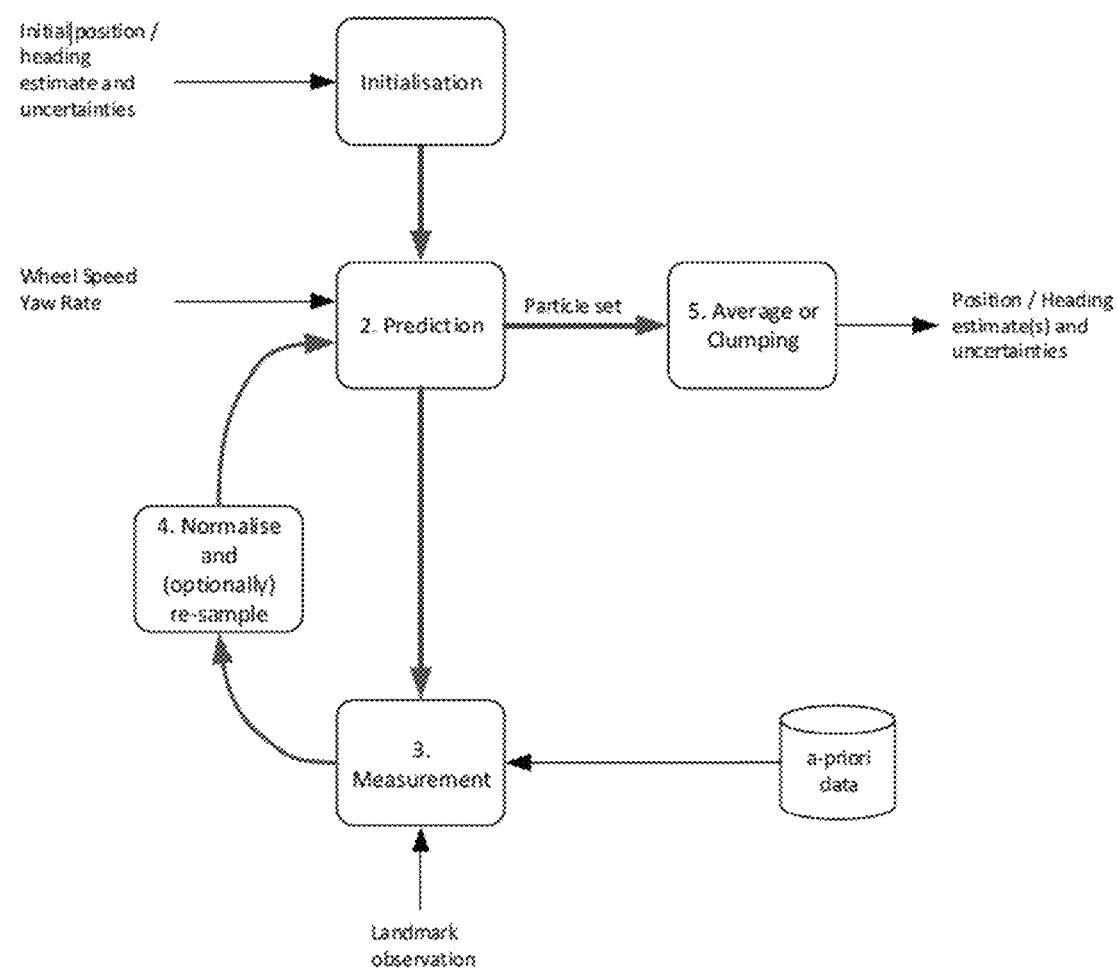
FIG. 6 is a diagrammatic illustration of Particle Filter Process Steps.

FIG. 6 sets out an implementation of a Particle Filter process. The steps and their function are summarised as:
1) Initialisation—the particle set is initialised to reflect the initial belief in the state of the system
2) Prediction—each particle is propagated through the control process using the control input
3) Measurement—the particle weights are updated by the measurement input using the a-priori expectation of the measurement
4) Normalise and re-sample—the particle set is normalised and conditioned
5) Estimate System State—the state of the system is obtained directly from the particle set through averaging (single mode distribution) or through clumping and averaging (multi-model distributions)

The particles and particle set are defined and each of these processes is explained below.

Particle Definition

Each particle represents an estimate of the state of the system with an associated 'importance factor' or 'weight', the state vector is given by:

$$\underline{s}(t)=[\underline{l},\varphi,w]$$

Where, $\underline{l}$ is the vehicle positon within the navigation frame and is made up of the elements
$[l_x, l_y]$
$\varphi$ is the vehicle orientation (heading) within the navigation frame
w is the weight of the particle
The particle state is defined as a function of time (t).

Particle Set

The particle set is defined as a number, N, of particle instantiations. Individual particles within the set are identified with the superscript i and the set is denoted by S $$\underline{s}^i(t) \in S(t)(1 \leq i \leq N)$$

The number of particles will initially be set to 1000.

Taken as a whole the particle set represents the belief in the state of the system (i.e. the position and heading of the vehicle). The density of the particles within a given region of the state space coupled with their 'importance' represents the probability of that region representing the true system state.

The Prediction Step

Where the subject is a vehicle, the control input may be provided by a dead reckoning system that tracks vehicle motion using odometers on the rear axle (the average of the left and right wheel position increments approximates distance travelled at the centre of the axle) combined with a yaw rate sensing gyroscope. These measurements can be integrated in time to form a 2 dimensional track. Using a 2 dimensional motion model simplifies embodiments and the explanation here but will introduce errors in the more general environment that has significant deviation from a flat earth model.

The kinematic equations of motion are given for the case where the instantaneous speed and yaw rate of the vehicle are known:

$$\dot{s}_{lx}(t) = \dot{d}(t)\cos\varphi(t)$$

$$\dot{s}_{ly}(t) = \dot{d}(t)\sin\varphi(t)$$

$$\dot{\varphi}(t) = \alpha(t)$$

where $d(t)$ is the distance travelled, and $\alpha(t)$ is the yaw rate

An approximate solution (numeric integration) to the equations of motion is used:

$$s_{lx}(t) = s_{lx}(t-1) + \tilde{d}(t)\cos\tilde{\varphi}(t)$$

$$s_{ly}(t) = s_{ly}(t-1) + \tilde{d}(t)\sin\tilde{\varphi}(t)$$

where, $\tilde{d}(t)$ is the measured distance (average of rear wheel encoders), and $\tilde{\varphi}(t)$ is the integrated yaw rate gyro measurement (giving heading)

This model and the two input values are the control process and control inputs to the prediction stage, respectively.

It is observed that the predominant systematic error on the odometer is a scale factor error, for this reason the standard deviation of the odometer error is scaled according to the distance travelled. The errors inherent in the heading estimate are due to gyro bias and integrated gyro noise. The gross gyro bias common in low grade gyro sensors is observed at start up when the vehicle is stationary. Gyro bias will continue to change and this along with the integrated noise are modelled as a random walk.

Thus, the particle set is translated using the control inputs perturbed by random components, $n_{Heading}$ and $n_{Distance}$ $$s_\varphi(t) = s_\varphi(t-1) + \tilde{\varphi}(t-1) - n_{Heading}$$

$$s_{lx}(t) = s_{lx}(t-1) + \tilde{d}(t)(1-n_{Distance})\cos(s_\varphi(t))$$

$$s_{ly}(t) = s_{ly}(t-1) + \tilde{d}(t)(1-n_{Distance})\sin(s_\varphi(t))$$

with the random components drawn from two normal distributions, $$N(n_{Distance}; 0, \sigma_{ada\_zoais})$$

$$N(n_{Heading}; 0, \sigma_{gyro\_bias})$$

The result of repeated application of the prediction step is a particle set that represents the evolving probability distribution (belief) of the system state.

The initial belief in the state of the system follows one of two models. The first represents the situation where the position and heading of the vehicle is relatively well known within a known margin of error. This may be the case where a GNSS system has been previously active or where the initial position is manually read off a map and entered into the system. In this instance the particle set is initialised by drawing particles from a normal distribution whose mean value represents the best estimate of vehicle state and whose variance represents the uncertainty in the vehicle state.

The second initialisation model represents the situation where the vehicle position is completely unknown within a region and the vehicle's heading is completely unknown. In this case the particle set is drawn from a uniform random distribution covering the region and a uniform random distribution covering the full 360 degrees of heading.

Landmark Measurement

Figure 7:
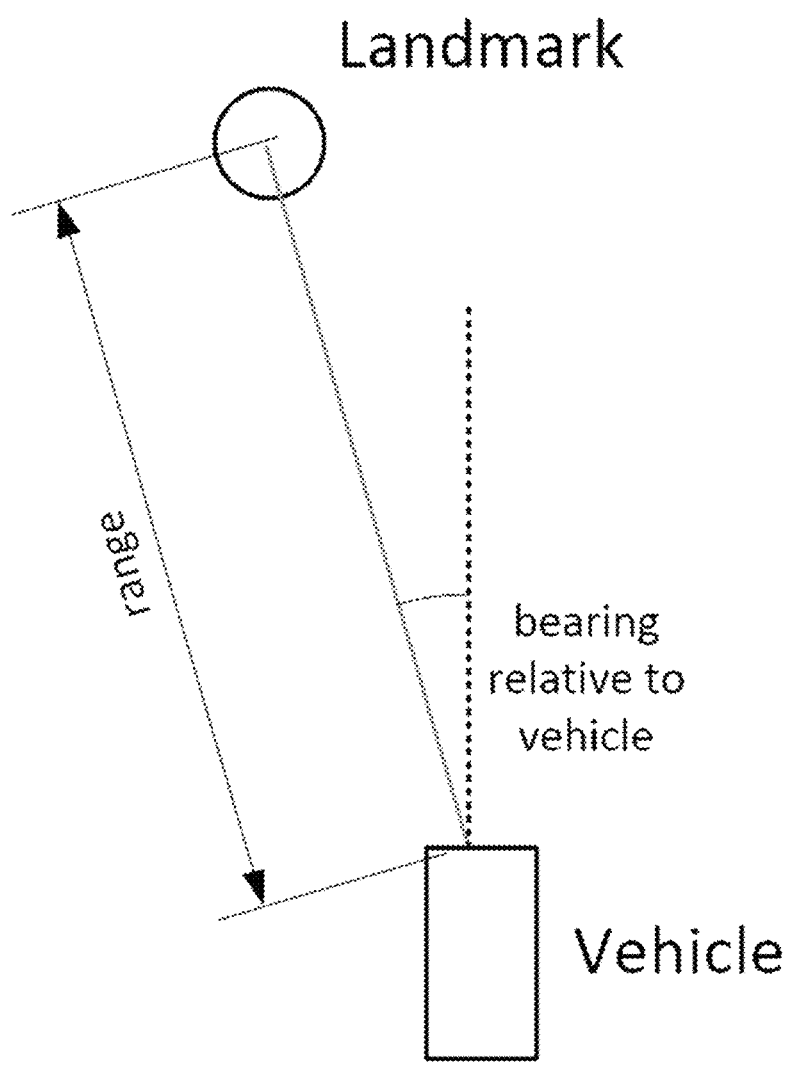
FIG. 7 is a diagrammatic representation illustrating a technique of landmark measurement.

As shown in FIG. 7, landmark measurements are provided by the Neural Network Classification and Detection system in the form of a measured range and relative bearing to a detected type of landmark. The a-priori data set (i.e. the object dataset) is then used along with the measurement data to update each of the particle weights. An outline of the algorithm to do this is presented below:

For each particle a measurement probability density function is generated given the features in the a-priori data set. This function incorporates the statistical errors in the measurement and in the a-priori data set. The dominant errors are the measurement range and bearing, particularly the estimate of range which is worse the further away the landmark feature is.

The probability function is then evaluated against the measurement and used to update that particle's weight. A high probability evaluated from the probability density function leads to that particle having its weight increased.

This is the same as saying 'for each feature in the a-priori data set what is the probability of making this measurement from this particle's position and heading?'

More formally the algorithm is constructed thus:

The particle set weights are updated, $$S_w^i(t) = S_w^s(t-1) \, \text{Prob}(z(t)|s^i(t)), \forall s \in S$$

Where, Prob $(z(t)|s^i(t))$ the probability of making the measurement, $z(t)$, given the particle state, $s^i(t)$, which is equal to the probability of the error between the expected landmark location and the measurement $$\text{Prob}(z(t)|s^i(t)) = \text{Prob}(e_z = z(t) - L^{i,j}(t)),$$

Where, $L^{i,j}(t)$ is the expected landmark location for landmark j given the particle i state. Thus, $$\text{Prob}(e_z = z(t) - L^{i,j}(t)) = P(z(t); L^{i,j}(t), SL^{i,j}(t)),$$

where $P(x; \mu, \Sigma)$ is the warped normal bivariate distribution probability density function, with parameters, x the random variable μ the mean Σ the covariance matrix Following the application of measurements in the update step, the particle weights are normalised such that the summed weights of the entire particle set sum to 1.

The total un-normalised weight of the particle set is, $$W = \Sigma_{i=1}^{N} S_w^i$$

the normalised weight for each particle is then, $$\frac{S_w^i}{W}$$

This step avoids having to carry scaling factors through the weight updates (since all particles are updated by the same measurement probability density function).

Resample Particles

Taking a random sample from within the state space there are many more particles that would have low importance than there are that would have a high importance. Over time this leads to only a few particles participating in the filter which reduces the effectiveness of both the control and measurement error models. For this reason it is necessary to resample the particle set such that more particles are in the regions of high importance which will give the prediction step and subsequent measurement updates more meaning. It is important to note the resampling process doesn't change the statistical properties of the system state probability distribution (system belief) but it does reconfigure the particle set.

The resampling process does not occur after every update and resample, but only when it is determined that the proportion of "effective" particles in the particle set drops below a configured threshold. This proportion is determined by finding the reciprocal of the sum of the squared particle weights:

$$\text{effective proportion} = \frac{1}{\sum_{i=1}^{N}(S_w^i)^2}$$

If this proportion falls below the configured threshold, resampling is performed. One such resampling method, suitable for this purpose, is the multinomial resampling method. This algorithm is straightforward to apply and computationally inexpensive.

The multinomial algorithm can be informally described by imagining a strip of paper where each particle has a section along the strip whose length is proportional to the particle weight. N (the number of particles) random locations are picked along the strip, and the particles associated with these sections are selected to exist in the replacement set.

Algorithmically, this is achieved by creating an array of the cumulative particle weights. N random numbers are generated from a uniform distribution in the range 0 to 1, and each array index where the cumulative weight is just greater than the random number is selected.

$$\text{Random number } u \sim U[0, 1)$$

$$\min_j \sum_{i=1}^{j} S_w^i > u \ (1 \leq j \leq N)$$

Following resampling, all particles are assigned equal weight:

$$S_w^i = \frac{1}{N}$$

The system state is simply given by taking the weighted sum of all the particles in the set, this is in effect the average of the particles.)

$$\bar{s}(t) = \Sigma_{i=1}^{N} s_w^i(t) s^i(t)$$

This type of state estimation is good for single mode particle distributions, where multiple modes are present a clumping and selection algorithm is more appropriate.

A resample threshold can be set to control how often the particle set is resampled to cull ineffective particles while duplicating effective particles, with particles having higher weights being more likely to be duplicated. The resample threshold can range from zero (no resampling will be performed) to 1.0 (resampling with every update), with typical values for normal operation ranging from 0.33 to 0.67. Higher values will cull outlying values more quickly resulting in the particle 'cloud' converging faster. However, if the resampling is too aggressive and the observations contain significant discrepancies when compared to the a-priori databases, the filter solution (average of the particles) may lock onto an incorrect solution, and if insufficient particles remain near the correct location then the filter cannot recover. Conversely, if the resample threshold is set too low, it will take longer for the particle cloud to converge for a given set of observations, so the particle density near the vehicle location will be lower than it would have been had resampling taken place.

As a further option, clustering of particles may be enabled. In that case, instead of the filter output being the average location of all the individual particles, the particles are assigned to clusters based on their distance to other nearby particles, and the output solution is the average of only the particles in the "strongest" (by weight) cluster. This mode is useful in circumstances where the scenario results in a small number of likely solutions (clusters of particles) before it is certain which single cluster is correct. For example, if there are two clusters of particles of roughly the same strength then the solution can appear in between the two clusters where there may be no particles and an obviously incorrect solution.

When allowing clustering, the solution is forced to be within the most likely cluster at the time. If it turns out the wrong cluster temporarily has the highest weight though, the solution can suddenly jump a large distance to another cluster as the heaviest cluster changes.

It is known that all sensors (wheel encoders, GPS receivers, neural network feature recognition, for example) produce measurement errors. The particle filter must model these errors in order that the particles may be propagated such that they do not move away from a correct solution due to not accounting for these measurement errors.

A "dead reckoning" model is used when translating particle positions with every vehicle movement in the data file. For a specified distance moved (from the wheel encoders) and heading (from the IMU), for each particle the filter adds normally distributed noise scaled according to a chosen standard deviation. The model is configured to match the sensor performance, e.g. if the wheel encoders have a known accuracy of +−1%, a distance Standard Deviation of 0.01 (i.e. 1 cm per metre) should match.

In embodiments, during operation of the system, images from the camera(s) and dead reckoning messages from the other sensors are stored. Dead reckoning messages are created using data from the vehicle's wheel encoders and Inertial Measurement Unit.

When an image is captured from the camera it is stored to disk, and all dead reckoning sensor messages are also stored.

The following are typically used in a vehicle data file:
timestamp (microseconds)—timestamp in microseconds from the top of the hour.
imu_status—State of the inertial measurement unit as an enumerated value.
distance (metres)—Distance travelled calculated from the two rear wheel encoder values.
roll (degrees)—IMU values in degrees.
pitch (degrees)—IMU values in degrees.
heading (degrees)—IMU values in degrees.
the relevant image file(s).

After images have been captured and stored to disk the images are passed into the CNN Detection process (the object detection module). This reads the Vehicle Data CSV file output from the previous stage, reading each row until one contains an entry in the image_filename column. The image is read from disk and passed into the CNN which then outputs a list of detected features. This list is then written to a new Feature CSV file and its filename is written to the feature_filename column for the current row in the Vehicle Data CSV file. The filename for this Feature CSV file has a prefix of 'f', the timestamp and the '.csv' extension. The following columns are used in the Feature CSV file:
range (metres)—The distance from the feature to the centre of the vehicle's rear axle.
bearing (degrees)—The bearing from the centre of the vehicle's rear axle to the centre of the feature.
tl x (pixels)—The top left x-axis coordinate of the feature's bounding box.
tl y (pixels)—The top left y-axis coordinate of the feature's bounding box.
width (pixels)—Width of the bounding box.
height (pixels)—Height of the bounding box.
type—The classification of the feature (tree, building, track edge, etc.).
confidence—A value between 0.0 and 1.0 with the confidence the neural net has in its detection.

Finally, this information is read by the Particle Filter process (i.e. the position detection module). The Particle Filter process starts by reading the Vehicle Data CSV file, reading all position data and propagating the dead reckoning and ground truth solutions. While reading this file it is also scans for rows that contain a non-empty feature_filename field and reads the file. The Feature CSV file is parsed and the data is fed into the particle filter. To aid development, the image_filename field is also used to display the current image originally captured by the camera, with detected feature bounding boxes shown overlaid.

To cope with the latency of the CNN measurements the particle filter output is 'held back' in time at the time the image frame was presented to the CNN classification and detection system. Further latency is added by the particle filter processing the measurements.

To enable up to date real-time operation with a continuous smooth (in time) navigation solution the latent particle filter solution is brought up to time using buffered dead reckoning data. Dead reckoning errors over the latency time period are assumed to be small (predominantly a function of odometer scale factor error and heading misalignment)

Improving on this requires removing the dominant dead reckoning errors. Heading is already a state in the filter which would only be improved by increasing the accuracy and frequency of the landmark measurements. The scale factor error can be improved by modelling it as a state in the filter and letting the filter attempt to observe it, this can then be applied to the dead reckoning 'catch up' solution.

While example embodiments of the invention are described herein, it should be understood that features of different embodiments may be combined with one another, in isolation from one another or in any combination, unless stated otherwise.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of determining a position or bearing of a subject, comprising:
obtaining and storing locally an object dataset comprising object data indicative of one or more objects in an environment, including an indication of object parameters associated with the one or more objects, the object parameters including one or more locations of the one or more objects in the environment and one or more semantic type classifications associated with the one or more objects, wherein one of the one or more semantic type classifications is an object type classification;
obtaining environment data indicative of a region of the environment from a sensor associated with the subject;
using an Artificial Neural Network to determine a presence of an observed object in the environment data, and to determine one or more observed object parameters associated with the observed object including at least a semantic type classification of the observed object;
determining a correspondence between the observed object and one or more corresponding objects in the locally stored object dataset, based on a comparison of the observed object parameters including the semantic type classification of the observed object and object parameters including the one or more semantic type classifications associated with the one or more objects of the locally stored object dataset; and
determining the position or bearing of the subject based on one or more locations of the one or more corresponding objects in the locally stored object dataset;
wherein the determining the position or bearing of the subject includes determining a probability distribution over a plurality of potential positions or bearings by using a particle filter algorithm to assess a likelihood of the subject being at each of the plurality of potential positions or on each of the plurality of potential bearings.

2. The method of claim 1, wherein the sensor is a camera and the environment data comprises image data.

3. The method of claim 1, wherein the obtaining and storing the object dataset further comprises:
obtaining environment information describing the environment; and
determining presence of the one or more objects in the environment from the environment information, determining object parameters associated with the one or more objects using the Artificial Neural Network to classify the one or more objects, and associating the one or more objects with respective one or more locations within the environment.

4. The method of claim 1, wherein the objects are landmarks, including one or more of vegetation, buildings, structures, geographic features, signs, telegraph poles, pylons, street lights, roads, road edges, or road markings.

5. The method according to claim 1, in which the subject is at least partially autonomous, and the method further includes controlling the subject or performing an action based on the determined position or bearing of the subject.

6. The method according to claim 1, in which the subject is a vehicle.

7. A method of determining a position or bearing of a subject, comprising:
   obtaining and storing locally an object dataset comprising object data indicative of one or more objects in an environment, including an indication of object parameters associated with the one or more objects, the object parameters including one or more locations of the one or more objects in the environment and one or more semantic type classifications associated with the one or more objects, wherein one of the one or more semantic type classifications is an object type classification;
   obtaining environment data indicative of a region of the environment from a sensor associated with the subject;
   using an Artificial Neural Network to determine a presence of an observed object in the environment data, and to determine one or more observed object parameters associated with the observed object including at least a semantic type classification of the observed object;
   wherein the obtaining and storing the object dataset further comprises:
      obtaining environment information describing the environment; and
      determining presence of the one or more objects in the environment from the environment information, determining object parameters associated with the one or more objects using the Artificial Neural Network to classify the one or more objects, and associating the one or more objects with respective one or more locations within the environment;
   determining a correspondence between the observed object and one or more corresponding objects in the locally stored object dataset, based on a comparison of the observed object parameters including the semantic type classification of the observed object and object parameters including the one or more semantic type classifications associated with the one or more objects of the locally stored object dataset; and
   determining the position or bearing of the subject based on one or more locations of the one or more corresponding objects in the locally stored object dataset, wherein the obtaining environment information describing the environment occurs either concurrently with or intermittently with the determining the position or bearing of the subject.

8. The method of claim 7, wherein the determining the position or bearing of the subject includes determining a probability distribution over a plurality of potential positions or bearings by using a particle filter algorithm to assess a likelihood of the subject being at each of the plurality of potential positions or on each of the plurality of potential bearings.

9. A method of determining a position or bearing of a subject, comprising:
   obtaining and storing an object dataset comprising object data indicative of one or more objects in an environment, including an indication of object parameters associated with the one or more objects, the object parameters including one or more locations of the one or more objects in the environment and one or more semantic type classifications associated with the one or more objects;
   obtaining environment data indicative of a region of the environment from a sensor associated with the subject;
   using an Artificial Neural Network to determine a presence of an observed object in the environment data, and to determine one or more observed object parameters associated with the observed object including at least a semantic type classification of the observed object;
   determining a correspondence between the observed object and one or more corresponding objects in the object dataset, based on a comparison of the observed object parameters including the semantic type classification of the observed object and object parameters including the one or more semantic type classifications associated with the one or more objects of the object dataset; and
   determining the position or bearing of the subject based on one or more locations of the one or more corresponding objects in the object dataset;
   wherein the determining the correspondence between the observed object and the one or more corresponding objects in the object dataset includes using the Artificial Neural Network to map the environment data indicative of the region of the environment to a probability distribution over the one or more semantic type classifications associated with the one or more objects in the object dataset, and indicating assessed likelihood that the observed object is associated with each of the one or more semantic type classifications.

10. A system for determining a position or bearing of a subject, comprising:
   a local storage device that stores an object dataset comprising object data indicative of one or more objects in an environment, including an indication of object parameters associated with the one or more objects, the object parameters including one or more locations of the one or more objects in the environment and one or more semantic type classifications associated with the one or more objects, wherein one of the one or more semantic type classifications is an object type classification;
   a sensor configured to obtain environment data indicative of a region of the environment, an object detection module configured to use an Artificial Neural Network to determine a presence of an observed object in the environment data, and to determine one or more observed object parameters associated with the observed object including at least a semantic type classification of the observed object;
   the object detection module further configured to determine a correspondence between the observed object and one or more corresponding objects in the locally stored object dataset, based on a comparison of the observed object parameters including the semantic type classification of the observed object and object parameters including the one or more semantic type classifications associated with the one or more objects of the locally stored object dataset; and
   a position detection module that determines the position or bearing of the subject based on one or more locations of the one or more corresponding objects in the locally stored object dataset, wherein the position detection module is configured to implement a particle filter algorithm to determine a probability distribution over a plurality of potential positions or bearings of the subject, indicating a likelihood that the subject is at each of the plurality of potential positions or on each of the plurality of potential bearings.

11. The system of claim 10, wherein the sensor is a camera and the environment data comprises image data.

12. The system of claim 10, wherein the system further includes an object dataset generator module which is configured to:
obtain an image of the environment, and
determine presence of the one or more objects in the environment from the image, determine object parameters associated with the one or more objects using the Artificial Neural Network to classify the one or more objects, and associate the one or more objects with respective one or more locations within the environment.

13. The system of claim 10, wherein the objects are landmarks, including one or more of vegetation, buildings, structures, geographic features, signs, telegraph poles, pylons, street lights, roads, road edges, or road markings.

14. The system of claim 10, wherein the subject is a vehicle.

15. The system of claim 14, wherein the vehicle is at least partially autonomous, and the system is configured to output a direct instruction to cause an automated response from the vehicle.

16. A vehicle including the system of claim 10.

17. A system for determining a position or bearing of a subject, comprising:
a local storage device that stores an object dataset comprising object data indicative of one or more objects in an environment, including an indication of object parameters associated with the one or more objects, the object parameters including one or more locations of the one or more objects in the environment and one or more semantic type classifications associated with the one or more objects, wherein one of the one or more semantic type classifications is an object type classification;
a sensor configured to obtain environment information describing the environment,
an object detection module is configured to:
determine presence of the one or more objects in the environment from the environment information using an Artificial Neural Network, and
determine the object parameters associated with the one or more objects including the one or more locations of the one or more objects in the environment and the one or more semantic type classifications associated with the one or more objects;
the object detection module further configured to determine a correspondence between the one or more objects and one or more corresponding objects in the locally stored object dataset, based on a comparison of first object parameters including the one or more semantic type classifications of the one or more objects and second object parameters including the one or more semantic type classifications associated with the one or more corresponding objects of the locally stored object dataset; and
a position detection module that determines the position or bearing of the subject based on one or more locations of the one or more corresponding objects in the locally stored object dataset.

18. The system of claim 17, wherein the position detection module is configured to implement a particle filter algorithm to determine a probability distribution over a plurality of potential positions or bearings of the subject, indicating a likelihood that the subject is at each of the plurality of potential positions or on each of the plurality of potential bearings.

19. The system of claim 17, wherein the sensor is a camera, and the environment information comprises one or more images of the environment.

20. The system of claim 17, wherein the system is further configured to determine and store newly determined object parameters in the locally stored object dataset either concurrently with or intermittently with operating the position detection module.

* * * * *